Jan. 29, 1963    E. V. NIECE    3,075,812
PLURAL UNIT SIDE DUMPING HOPPER
Filed Feb. 9, 1959    4 Sheets-Sheet 1
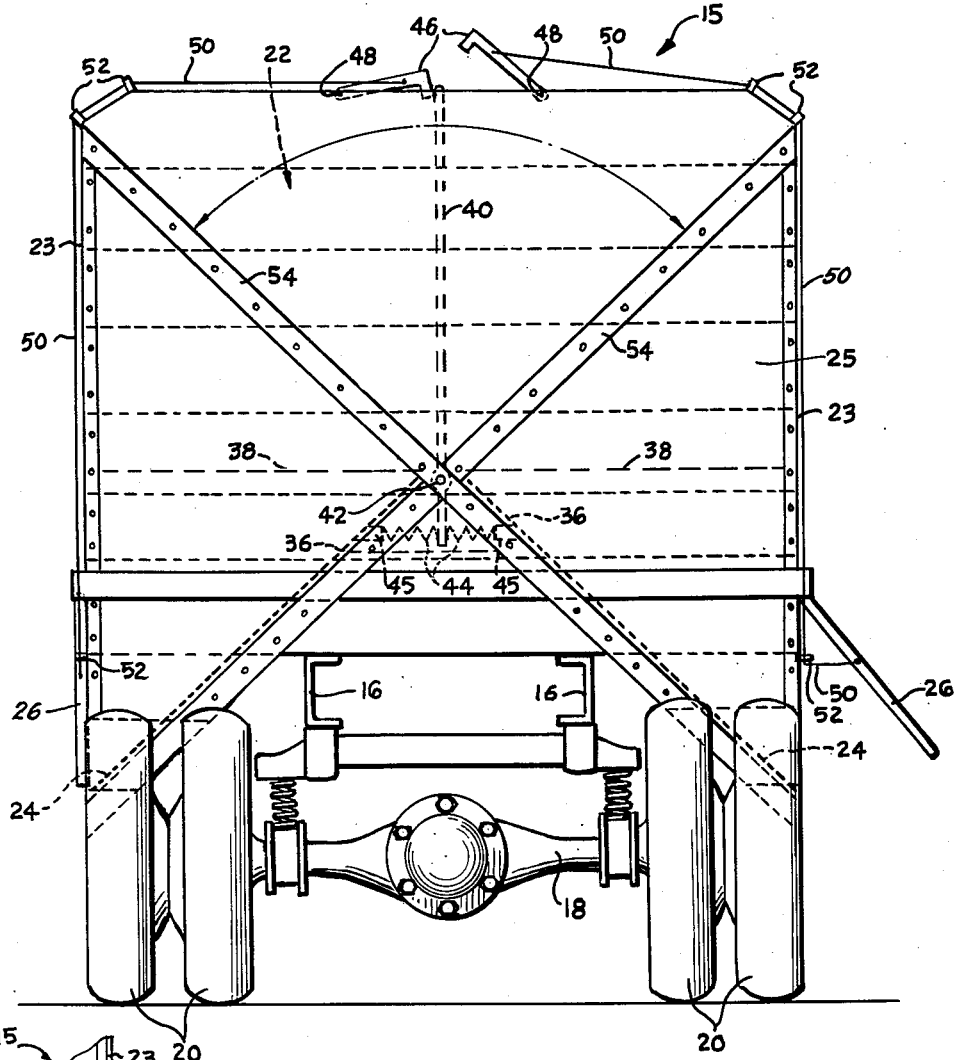
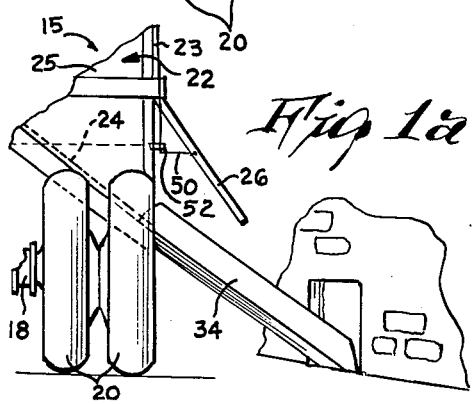
INVENTOR.
EDGAR VERNON NIECE
BY
Carl Miller
ATTORNEY Jan. 29, 1963 E. V. NIECE 3,075,812
PLURAL UNIT SIDE DUMPING HOPPER
Filed Feb. 9, 1959 4 Sheets-Sheet 2
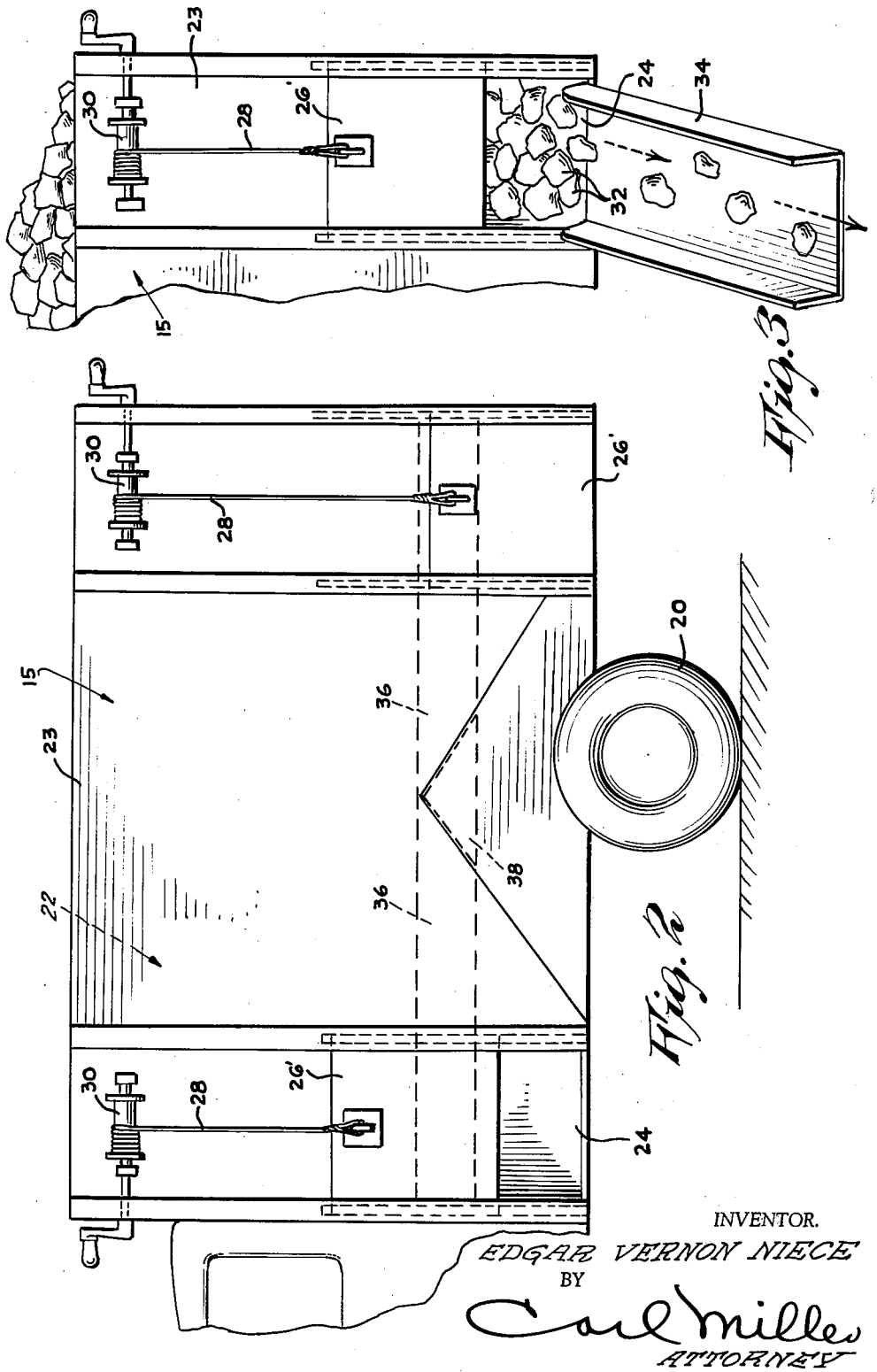
INVENTOR.
EDGAR VERNON NIECE
BY
Carl Miller
ATTORNEY Jan. 29, 1963
E. V. NIECE
3,075,812
PLURAL UNIT SIDE DUMPING HOPPER
Filed Feb. 9, 1959
4 Sheets-Sheet 3
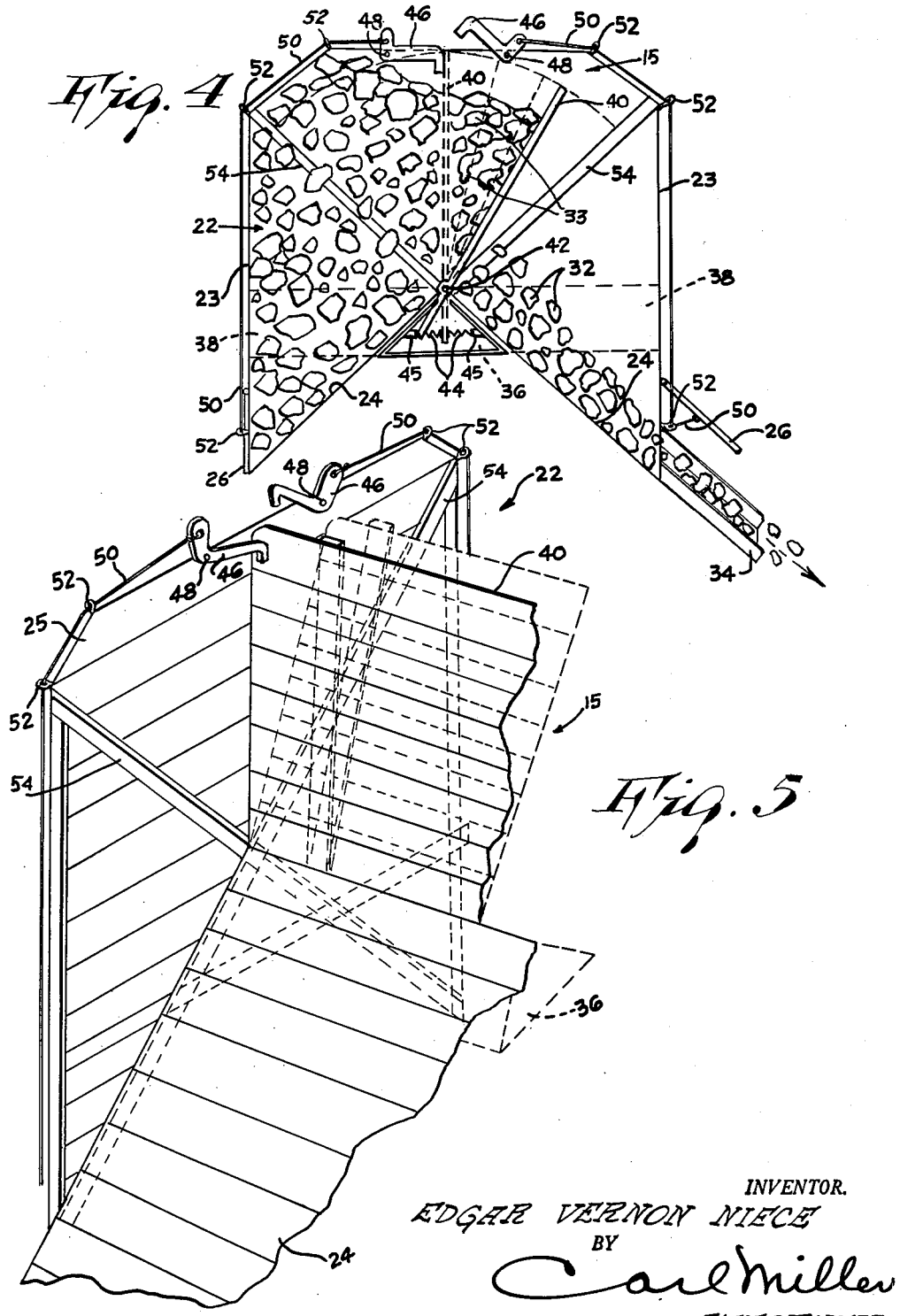
INVENTOR.
EDGAR VERNON NIECE
BY
Carl Miller
ATTORNEY Jan. 29, 1963  E. V. NIECE  3,075,812
PLURAL UNIT SIDE DUMPING HOPPER
Filed Feb. 9, 1959  4 Sheets-Sheet 4
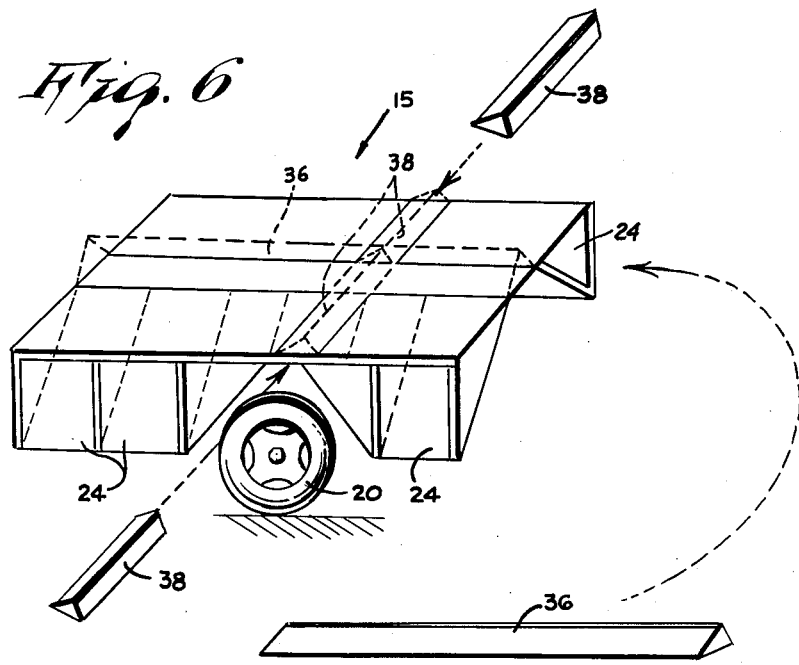
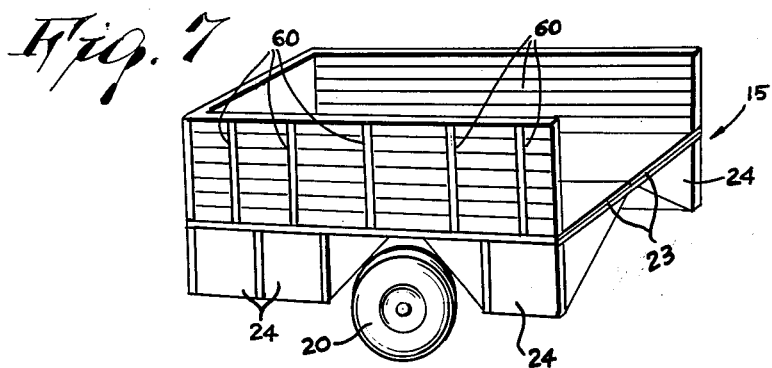
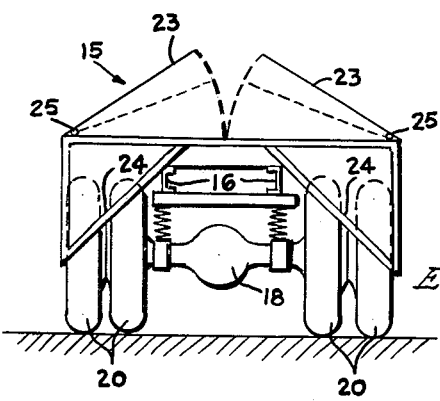
INVENTOR.
EDGAR VERNON NIECE
BY
Carl Miller
ATTORNEY

United States Patent Office 3,075,812
Patented Jan. 29, 1963

3,075,812
PLURAL UNIT SIDE DUMPING HOPPER
Edgar Vernon Niece, 1730 Blaine Ave., Terre Haute, Ind.
Filed Feb. 9, 1959, Ser. No. 792,093
6 Claims. (Cl. 298—8)

This invention relates to vehicles and, more particularly, to a side emptying truck body.

While there are various types of side unloading dump bodies, such usually present problems not associated with other types of dump bodies used for delivering fluent material, such as coal, sand, and gravel. Accordingly, it is an object of the present invention to provide an improved side delivery type truck body that will enable such fluent material to be properly and efficiently emptied without damage to the truck body or associated parts.

Another object of the present invention is to provide a side emptying truck body having self contained weight distributing means therewithin which will tend to equalize the loading of the body when emptying material from one side thereof.

Another object of the present invention is to provide a side emptying truck body of the type described in which the sides may be folded down upon the delivery chutes of the body so as to enable such device to be converted into a stake type truck body for other hauling purposes.

Still another object of the present invention is to provide a side emptying truck body of the above type which can be fabricated and constructed at a relatively low cost so as to enable it to be used for all types of hauling of fluent material.

All of the foregoing and still further objects and advantages of this invention will become apparent from a study of the following specification, taken in connection with the accompanying drawing, wherein:

FIGURE 1 is a rear elevational view of a truck body made in accordance with the present invention;

FIGURE 1a is a fragmentary rear elevational view of the device shown in FIGURE 1 in operative use;

FIGURE 2 is a fragmentary side elevational view of a vehicle having a truck body of slightly modified construction;

FIGURE 3 is a fragmentary side elevational view of certain parts of the structure shown in FIGURE 2 in operative use;

FIGURE 4 is a fragmentary transverse cross sectional view of the operating parts of the unit shown in FIGURE 3;

FIGURE 5 is a fragmentary perspective view of certain parts of the truck body shown in FIGURE 4;

FIGURE 6 is an exploded perspective view of certain parts of the truck body made in accordance with the present invention during conversion thereof to a stake type body;

FIGURE 7 is a view similar to FIGURE 6, showing the stake body conversion completed; and FIGURE 8 is a rear elevational view of certain parts of the structure shown in FIGURE 6, during the conversion thereof to the stake type body.

Referring now to the drawing, and more particularly to FIGURES 1 and 1a thereof, a side opening truck body 15 made in accordance with the present invention is shown to include an underframe 16 which is supported upon an axle 18 having a plurality of wheels 20. The truck body includes a fluent material storage unit 22 constructed from a pair of side walls 23 and opposite front and rear walls 25 with cross braces 54. Each side wall 23 is provided with a pair of pivotally mounted doors 26 which may be locked in any suitable manner and which are rotatable between a normally closed position and the open position to form closure means illustrated in FIGURES 1 and 1a, in which open position the fluent material 32, such as coal, may be discharged outwardly into a delivery chute 34 from the wells 24 beneath the floor level of the truck body.

As is more clearly shown in FIGURE 6 of the drawing, a center divider 36 and a pair of side dividers 38 aportion the interior of the truck body into separate areas, each of which has at least one well 24 through which the fluent material is discharged when the respective gate is opened, such as is shown in FIGURE 4 of the drawing.

In FIGURES 2 and 3 of the drawing, a slightly modified type of gate 26' is shown which is slidably carried by the side walls 23 of the truck body for selective movement between a normally closed position and an open position, in response to rotation of a hand operated winch 30 that controls the movement of the flexible cable 28 connected to each such gate 26'. Aside from the particular type of gate 26, 26', the general construction of the associated parts in all of the figures of the drawing are the same.

A wall type partition 40 extending longitudinally through the center of the interior of the truck body divides the interior space into substantially two separate sides. This partition 40 is pivotally mounted by means of a longitudinal hinge pin assembly 42 adjacent to the lower end thereof. However, compression springs 44 are carried by abutments 45, which springs 44 act on the opposite sides of the lower end of the partition 40 to urge it toward a centered upright position, and the partition 40 is maintained in the upright position by means of a pair of bell crank levers 46 pivotally carried by pins 48 upon the back wall of the truck body, as is clearly shown in FIGURES 4 and 5.

Flexible cables 50 connected at one end to the free end of each bell crank 46 extend through provided guides 52 on the truck body into engagement at the opposite end with the respective one of the gates for effecting movement thereof to the open position, thus, the activated gate exerts a pull upon the cable 50 to rotate the adjacent bell crank 46 toward an open position, to thus release the partition wall 40 for movement in a direction toward the side of the vehicle being emptied. As a result, as the fluent material 32 leaves the opened gate on the one side of the vehicle, the fluent material 33 on the opposite side of the vehicle will urge the partition wall 40 about its pivotal connection 42 toward the emptied side of the vehicle, thus distributing a portion of the load on the other side of the truck body over the entire width thereof, in the manner shown in FIGURE 4. In the event that the truck body is emptied from the other side, the reverse procedure will take place. Finally, after the both sides of the vehicle have been emptied, the springs 44 will return the partition wall 40 to the normally upright position, in which position the bell cranks 46 will effectively lock it in the upright position.

Whenever it is desired to change the body from the side opening type hereinbefore described, it is only necessary to remove the dividers 36, 38, in the manner shown in FIGURES 6 to 8 of the drawing, following which the sides 23 may be rotated about pivot 25 over the chutes 24, to provide a flat bed. By then attaching stake type side walls 60 in the manner shown in FIGURE 7, the interior of the truck body may be used for hauling various types of equipment. The general usefulness of the truck body is therefore substantially increased.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. A truck body comprising, in combination, an underframe, a pair of side walls, and opposite front and back walls supported upon said underframe defining a central load receiving area, partition means dividing said central load receiving area into a plurality of sections communicating with each other, closure means carried by said side walls for controlling the outward movement of the load therethrough, load equalizing means carried by said underframe extending into the interior of said load receiving area, said side walls being pivotally carried upon said underframe for selective movement between a normally upright position and an adjusted lowered position, chutes having a plurality of side openings supported and defined by said underframe and extending below said side walls, said closure means comprising a plurality of doors carried by said side walls each adjacent to one of said chutes, said doors selectively movable between a normally closed and open position for controlling the passage of fluent material outwardly from the interior of the truck body, and said partition means comprising a plurality of removably mounted baffle elements directing the fluent load within said truck body toward each of said doors in said side walls.

2. A truck body as set forth in claim 1, wherein said load equalizing means comprises a substantially central longitudinally extending panel pivotally mounted adjacent to a lower extremity thereof upon said underframe intermediate both of said sides.

3. A truck body as set forth in claim 2, wherein said partition is pivotally mounted for movement toward and away from both of said pair of truck body sides, and releasable lock means securing said partition in a substantially upright central position.

4. A truck body as set forth in claim 3, wherein said releasable lock means comprises a pair of bell cranks pivotally mounted upon said back wall of said truck body, one of said bell cranks being in abutting engagement with each side of said partition, and cable means acting between each said bell crank and said closure doors of each side of said truck body for selectively unlocking said partition for movement toward one side of said truck body in response to the opening of said closure doors on said one side of said truck body.

5. A truck body as set forth in claim 4, further comprising spring means yieldably resisting said pivotal movement of said partition, and said spring means resiliently returning said partition to said normally centered upright position in response to the complete emptying of said truck body.

6. A truck body as set forth in claim 5, wherein said spring means comprises a pair of compression springs, carried by said underframe, each one of said compression springs acting upon an opposite side of said partition adjacent to said pivotal connection thereof to said underframe yieldably urging said partition toward said normal upright position.

References Cited in the file of this patent

UNITED STATES PATENTS

| | | |
|---|---|---|
| 183,334 | Shaffer | Oct. 17, 1876 |
| 766,871 | Brosnan | Aug. 9, 1904 |
| 909,860 | Apgar | Jan. 19, 1909 |
| 975,861 | Harrigan | Nov. 15, 1910 |
| 1,268,588 | Lichtenstein | June 4, 1918 |
| 1,293,954 | Skidmore | Feb. 11, 1919 |
| 1,634,021 | Curran et al. | June 28, 1927 |
| 2,076,005 | Sansford | Apr. 6, 1937 |
| 2,169,463 | Eisenberg | Aug. 15, 1939 |

FOREIGN PATENTS

| | | |
|---|---|---|
| 331,306 | Germany | Jan. 5, 1921 |